(12) United States Patent
Paromtchik et al.

(10) Patent No.: US 6,629,028 B2
(45) Date of Patent: Sep. 30, 2003

(54) METHOD AND SYSTEM OF OPTICAL GUIDANCE OF MOBILE BODY

(75) Inventors: Igor E. Paromtchik, Saitama (JP); Hajime Asama, Saitama (JP)

(73) Assignee: Riken, Saitama (JP)

( * ) Notice: Subject to any disclaimer, the term of this patent is extended or adjusted under 35 U.S.C. 154(b) by 0 days.

(21) Appl. No.: 09/893,653

(22) Filed: Jun. 29, 2001

(65) Prior Publication Data

US 2002/0027652 A1 Mar. 7, 2002

(30) Foreign Application Priority Data

Jun. 29, 2000 (JP) ........................................ 2000-196977

(51) Int. Cl.$^7$ ................................................ G05D 1/00
(52) U.S. Cl. .......................... 701/23; 701/28; 180/169; 372/12
(58) Field of Search ............................. 701/23, 27, 68, 701/28; 180/169; 372/12; 359/143, 152, 159

(56) References Cited

U.S. PATENT DOCUMENTS

| | | |
|---|---|---|
| 3,779,492 A | * 12/1973 | Grumet ...................... 244/3.17 |
| 4,773,018 A | 9/1988 | Lundstrom |
| 4,790,402 A | 12/1988 | Field et al. |
| 4,817,000 A | 3/1989 | Eberhardt |
| 4,846,297 A | 7/1989 | Field et al. |
| 4,855,915 A | 8/1989 | Dallaire |
| 4,856,896 A | 8/1989 | Farr |
| 4,858,132 A | 8/1989 | Holmquist |
| 4,916,713 A | 4/1990 | Gerber |
| 4,947,094 A | 8/1990 | Dyer et al. |
| 5,285,205 A | 2/1994 | White |
| 5,622,236 A | 4/1997 | Azumi et al. |
| 5,815,825 A | 9/1998 | Tachibana et al. |
| 6,237,500 B1 | * 5/2001 | Lund ........................ 104/88.01 |

* cited by examiner

Primary Examiner—Gertrude Arthur
(74) Attorney, Agent, or Firm—Birch, Stewart, Kolasch & Birch, LLP

(57) ABSTRACT

In order to set target positions in the case where mobile bodies such as mobile robots transfer in accordance with a manner different from that of the prior art, a method for instructing such target positions of at least one or more of the mobile bodies contained movably in a predetermined environment comprises light beacons being produced by a light beam projecting device in a surface on which the mobile bodies are to be transferred, whereby the target positions towards which the mobile bodies are to be transferred being instructed.

34 Claims, 3 Drawing Sheets

METHOD AND SYSTEM OF OPTICAL GUIDANCE OF MOBILE BODY

The entire disclosure of Japanese Patent Application No. 2000-196977 filed on Jun. 29, 2000 including specification, claims, drawings and summary are incorporated herein by reference in its entirety.

BACKGROUND OF THE INVENTION

1. Field of the Invention

The present invention relates to a method for instructing target positions for mobile bodies, a method for controlling transfer thereof, and a method as well as a system of optical guidance therefor, and more particularly to a method for instructing target positions for mobile bodies, a method for controlling transfer thereof, and a method as well as a system of optical guidance therefor, all of which are suitably used in the case where mobile bodies such as wheeled or walking mobile robots are guided.

2. Description of the Related Art

In general, a mobile body such as an autonomous omni-directional mobile robot has been known as a mobile body being movable in a given environment.

Incidentally in case of transfer in such mobile body, it is required to specify a position of coordinates of the mobile body in question in an environment wherein the mobile body can be transferred in order to set a position that is a target to be determined as its goal by the mobile body in question (hereinafter referred to as "target position"). The actual position of coordinates of a mobile body can be generally determined on the basis of dead-reckoning, for example such as from the odometry data of the mobile body.

However, when a position of coordinates is determined only based on the dead-reckoning data of a mobile body, there has been such problem that errors defined between the position of coordinates in the mobile body determined on the basis of the dead-reckoning data of the mobile body and a position of coordinates on which the mobile body resides in reality are accumulated, because of a limit in precision for working traveling wheels or legs in the mobile body and slippage (running idle) of such traveling wheels or legs in the case when the mobile body travels in a given environment.

For this reason, it has been necessary for compensating a position of coordinates obtained on the basis of the dead-reckoning data of a mobile body by the use of either means for functioning as sensors such as sonar, gyroscope, and camera, or land-marks in a given environment in order to specify correctly a position where the mobile body resides actually in the environment.

On the other hand, known methods of motion control of a mobile body in an environment rely on, for example, a common coordinate system wherein positions of coordinates of mobile bodies in the environment and environmental objects are computed, and the respective positions of coordinates obtained as a result of the computation are represented in an environmental model indicating the environment thereof.

In this case, it is required that the newest positions of coordinates are to be supplied always into the environmental model to acquire the newest position of a mobile body in the environment.

As described above, however, there are errors each of which exists between a position of coordinates of a mobile body determined on the basis of dead-reckoning data of the mobile body in question and a position of coordinates of the mobile body where the mobile body resides actually, and such errors are accumulated with travel of the mobile body, so that a discrepancy between the actual position of the mobile body in the environment and its computed one in the environment model increases over travel time and becomes substantial.

In this respect, if target positions towards which the mobile body is to be transferred are set on the basis of coordinate positions of the mobile body in the environmental model, which do not correspond to that of the mobile body residing actually in the environment, there has been such a problem that it results in unexpected dangerous motion of the mobile body in the environment.

Accordingly, to exclude such unexpected dangerous motion of the mobile body in the environment in the case when target positions towards which the mobile body is to be transferred in the environment, the above-described discrepancy (the discrepancy between the actual position of the mobile body in the environment and its computed coordinate positions in the environment model must be compensated).

The above-described problem can be eliminated if a target position is indicated in the environment and its numerical coordinates are implicitly transmitted to the mobile body, which detects the indicated target positions and evaluates its relative coordinates by means of a visual feedback. In this case, a transformation between the common coordinate system and the mobile body's coordinate system becomes less relevant or is not even required, and the above-described discrepancy is compensated by means of visual feedback.

A variety of manners has been proposed heretofore as methods for guiding mobile bodies.

Namely, U.S. Pat. No. 5,622,236 discloses to draw a guidance line on a floor surface, or U.S. Pat. No. 4,947,094 discloses to draw a guidance line on a ceiling. Furthermore, it is disclosed by U.S. Pat. No. 5,815,825 to use magnetic markers in a floor surface. Moreover, it is disclosed by U.S. Pat. Nos. 4,773,018 and 4,858,132 to track a stationary light source.

Besides, a vehicle guidance by means of a laser beam is proposed and disclosed in U.S. Pat. No. 5,285,205 wherein a stationary laser indicates a path direction to a human operator situated inside the vehicle, and concerning this method, see also U.S. Pat. No. 4,856,896.

Further, a scanning laser mounted on a vehicle is proposed and disclosed in U.S. Pat. No. 4,790,402 wherein the laser serves as a transmitter-receiver to measure relative distances to the surrounding objects.

Moreover, reflective beacons in the environment are proposed in U.S. Pat. Nos. 4,855,915, 4,846,297, and 4,817,000.

Besides, indication of a target by means of projection of laser light onto the target where it forms a light dot (spot) is known, for instance, in a field of weapons. Namely, a device to adjust the laser optical axis with the axis of the weapon is proposed in U.S. Pat. No. 4,916,713.

OBJECTS AND SUMMARY OF THE INVENTION

The present invention has been made in view of the prior art as described above, and an object of the invention is to provide method for instructing target positions for mobile bodies wherein target positions in the case where the mobile bodies such as mobile robots can be instructed, a method for controlling movements thereof, and a method as well as a system of optical guidance therefor in accordance with a manner different from the prior art as described above.

Furthermore, another object of the present invention is to provide a method for instructing target positions for mobile bodies, which is used suitably in the case where the mobile bodies set target positions towards which the respective mobile bodies are to be transferred in an environment where a number of the mobile bodies such as mobile robots reside, a method for controlling transfer thereof, and a method as well as a system of optical guidance therefor.

Besides, another object of the present invention is to provide a method for instructing target positions for mobile bodies, which is used suitably in the case where a human being sets target positions towards which the mobile bodies are to be transferred in an environment where a number of the mobile bodies such as mobile robots reside, a method for controlling transfer thereof, and a method as well as a system of optical guidance therefor.

In order to achieve the above-described objects, a method for instructing target positions of at least one or more of mobile bodies contained movably in a predetermined environment according to the present invention comprises light beacons being produced by a light beam projecting device in a surface on which the mobile bodies are to be transferred, whereby target positions towards which the mobile bodies are to be transferred being instructed.

According to the present invention one mobile body can instruct target positions towards which another mobile body is to be transferred. For instance, it is possible to notify target positions towards which a specified mobile body of a number of mobile bodies in an environment is to be transferred.

In this respect, when light beacons are produced in a surface on which mobile bodies are to be transferred by projecting a light beam from a light beam projecting device, target positions may be appointed on a map in a display by clicking a mouse through a user interface with a user (human being) or by the like manner, and the light beam is projected onto the very positions, or it is possible to project the light beam onto the positions by means of a light beam projecting device which is remotely operated, for example through a network by another computer, the other mobile bodies or a human being.

Moreover, an example of the light beam-projecting device includes laser pointer, LED, mercury lamp, fluorescent lamp and other sources of focused light.

In this case, a laser pointer may be mounted on a predetermined place such as a ceiling, or a compact laser pointer, which can be held by a user (human being) and may change freely at hand a position onto which a light beam is to be projected may be employed.

Besides, a mobile body may be equipped with a laser pointer to indicate target positions for the other mobile bodies.

Furthermore, a method for controlling mobile bodies according to the present invention comprises the light beacons produced in the above-described surface on which the mobile bodies are to be transferred being detected by the use of a visual device of a mobile body mounted thereon, and a relative positional relationship between the target positions represented by the light beacons and a present position of the mobile body in question being computed by means of image data processing or signal processing, whereby the mobile body in question being controlled so as to transfer towards the light beacons produced in the above-described surface on which the mobile bodies are to be transferred.

In this case, for example, a charge coupled device (CCD) camera or a position sensing device (PSD) camera and the like may be used as the above-described visual device.

Furthermore, an optical guidance method for mobile bodies according to the present invention comprises target positions being instructed with respect to a predetermined mobile body while using the above-described light beam-projecting device, whereby the mobile body being guided to the target positions.

In this case, the above-described instruction for target positions is implemented by means of a user (human being), another computer, the other mobile bodies or the like.

Moreover, in the present invention, a light beam is used to project the same, whereby the light beacons, which are obtained by lighting on or lighting off only or are obtained by lighting a light beam having a predetermined features (i.e., colors of lights, shapes of areas lighting on, brightness of areas lighting on, manners of lighting on such as methods of blinking light beams, patterns of blinking light beams and so on), are produced on the surface on which mobile bodies are to be transferred in an environment, the resulting light beacons are used as target positions, the mobile bodies detect the light beacons (dots, spots) indicated as the target positions to specify relative coordinate positions defined between the light beacons (dots, spots) and the mobile bodies, thereby obtaining revised target positions.

In this case, if visual feedback is utilized in the case where target positions represented by light beacons having predetermined features (i.e., colors of lights, shapes of areas lighting on, brightness of areas lighting on, manners of lighting on such as methods of blinking light beams, patterns of blinking light beams and so on) on a surface on which mobile bodies are to be transferred are detected to specify them, a degree of accuracy in positioning of the mobile bodies in an environment can be elevated.

Besides, in case of updating positions of mobile bodies in an environmental model, when positions at which the mobile bodies exist actually in the environment are specified, a degree of precision in the updating can be elevated.

Namely, an optical guidance system for at least one or more of mobile bodies contained movably in a predetermined environment according to the present invention comprises a target position optically instructing means composed of a light beam projecting means for projecting a light beam having a predetermined color or other features in a desired region on a predetermined surface on which the mobile bodies are to be transferred to produce the predetermined colored beacons (dots, spots) in the desired region on the above-described predetermined surface, whereby the target positions towards which the mobile bodies are to be transferred are indicated; and a light beam projection control means for controlling operations of lighting up/lighting out in the above-described light beam projecting means, whereby starting/stopping projection of light beam on the above-described predetermined surface is controlled, besides an optical axis of the light beam projected from the above-described light beam projecting means is directed to a desired position on the above-described predetermined surface; a detection specifying means composed of a detection means for detecting the predetermined colored light beacons (dots, spots) produced on the above-described predetermined surface by means of a visual device; and a relative position specifying means for producing relative positional information, which indicates a relative position by specifying the relative position in question defined between the predetermined light beacons (dots, spots) that is an object to be detected by the above-described detection means and each of the mobile bodies in accordance with the results detected by the above-described detection means; and a transfer control means for controlling the mobile body, target positions of which have been indicated by means of the light beacons (dots, spots) derived from the above-described target position instructing means, so as to transfer towards the target positions on the basis of the relative positional information produced by the above-described relative position specifying means.

In this case, for example, a CCD or PSD camera, an optical sensor or the like may be used as the visual device.

In the present invention, the at least one or more of mobile bodies that are movable in a predetermined environment are equipped with the above-described detection specifying means, respectively.

Further, in the present invention, the above-described light beam projecting means is fixed at a predetermined position.

Moreover, in the present invention, a mobile body is equipped with the above-described light beam projecting means.

Besides, in the present invention, the above-described light beam projecting means is equipped with a robot manipulator, and the above-described light beam projection control means controls the above-described robot manipulator thereby directing an optical axis of the light beam projected from the above-described light beam projecting means to a desired position in the above-described predetermined surface on which the mobile bodies are to be transferred.

Besides, in the present invention, the above-described light beam projecting means is hand-held by a human operator who controls the described light beam projecting means and directs an optical axis of the light beam to a desired position in the surface on which the mobile bodies are to be transferred.

In addition, in the present invention, the above-described light beam projection control means controls the above-described light beam projecting means on the basis of information obtained through a network.

Furthermore, an optical guidance system for at least one or more of mobile bodies contained movably in a predetermined environment according to the present invention comprises a light beam projecting means for projecting a light beam having a predetermined color or other features in a desired region on a predetermined surface on which the mobile bodies are to be transferred to produce the predetermined light beacons in the desired region on the above-described predetermined surface, whereby the target positions towards which the mobile bodies are to be transferred are indicated, the above-described light beam projecting means being held by a human being and an optical axis of the light beam being directed to a desired position in the above-described predetermined surface by means of operations of the human being; a detection specifying means composed of a detection means for detecting the predetermined light beacons produced on the above-described predetermined surface by means of a visual device; and a relative position specifying means for producing relative positional information, which indicates a relative position by specifying the relative position in question defined between the predetermined light beacons that is an object to be detected by the above-described detection means and each of the mobile bodies in accordance with the results detected by the above-described detection means; and a transfer control means for controlling the mobile body, target positions of which have been indicated by means of the light beacons derived from a target position instructing means, so as to transfer towards the target positions on the basis of the relative positional information produced by the above-described relative position specifying means.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

An example of a preferred embodiment of a method for instructing target positions for mobile bodies, a method for controlling transfer thereof, and a method as well as a system of optical guidance therefor according to the present invention will be described in detail hereinafter by referring to the accompanying drawings.

Figure 1:
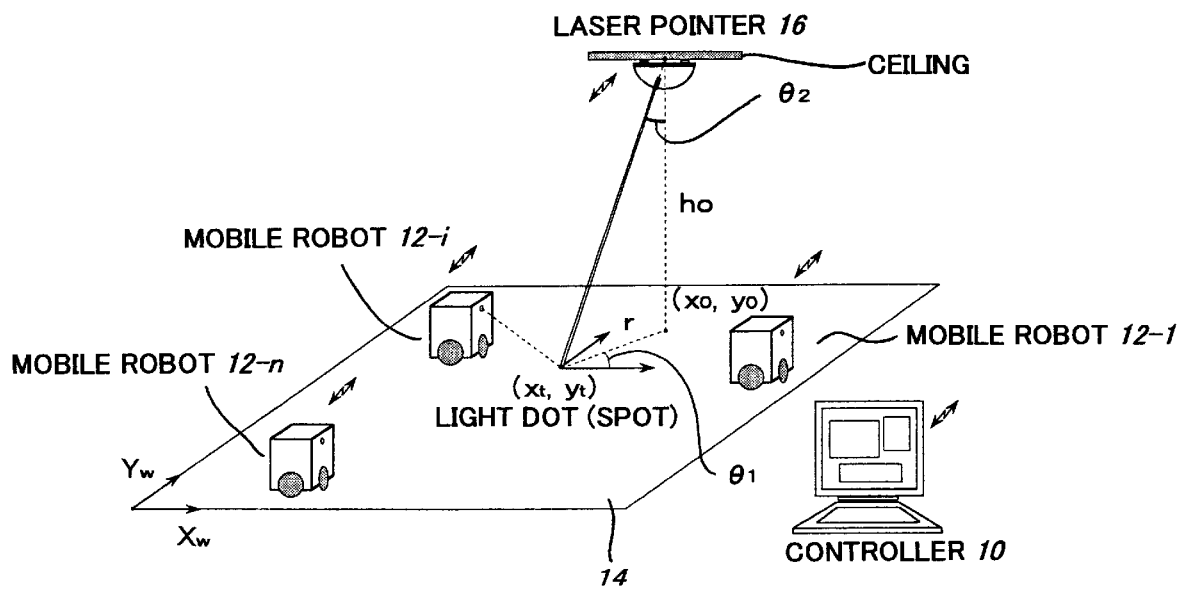
FIG. 1 is an explanatory block constitutional diagram showing an example of a preferred embodiment of an optical guidance system for mobile bodies according to the present invention.
Figure 2:
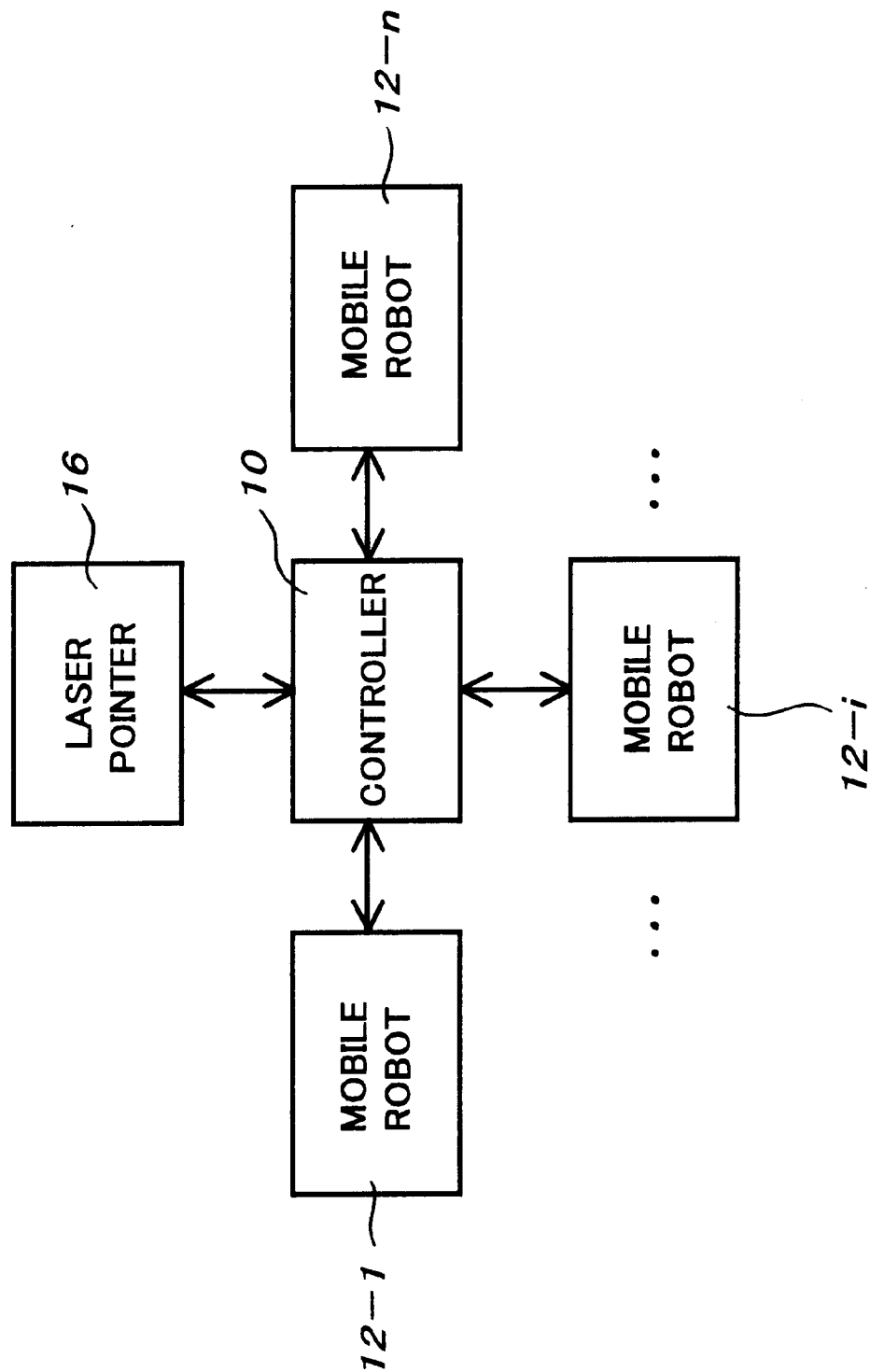
FIG. 2 is a block diagram showing an example of the preferred embodiment of an optical guidance system for mobile bodies according to the present invention shown in FIG. 1.

FIG. 1 is an explanatory block constitutional diagram showing an example of a preferred embodiment of an optical guidance system for mobile bodies according to the present invention; and FIG. 2 is a block diagram showing the example of the preferred embodiment of the optical guidance system for mobile bodies according to the invention shown in FIG. 1.

The optical guidance system for mobile bodies shown in FIGS. 1 and 2 is composed of a controller 10 for controlling overall operations of the optical guidance system for the mobile bodies, at least one or more mobile robots 12-1, ..., 12-$i$, ..., and 12-$n$ wherein "i" and "n" are positive integers and have a relationship of "1 $i$ $n$", and a laser pointer 16 as a light projecting device being a light projecting means for producing light beacons by projecting laser beam on a floor surface 14 corresponding to a surface on which the mobile robots 12-1, ..., 12-$i$, ..., and 12-$n$ are movable in the environment.

In the present preferred embodiment shown in FIG. 1, the laser pointer 16 is fixed stationarily on a ceiling.

Figure 3:
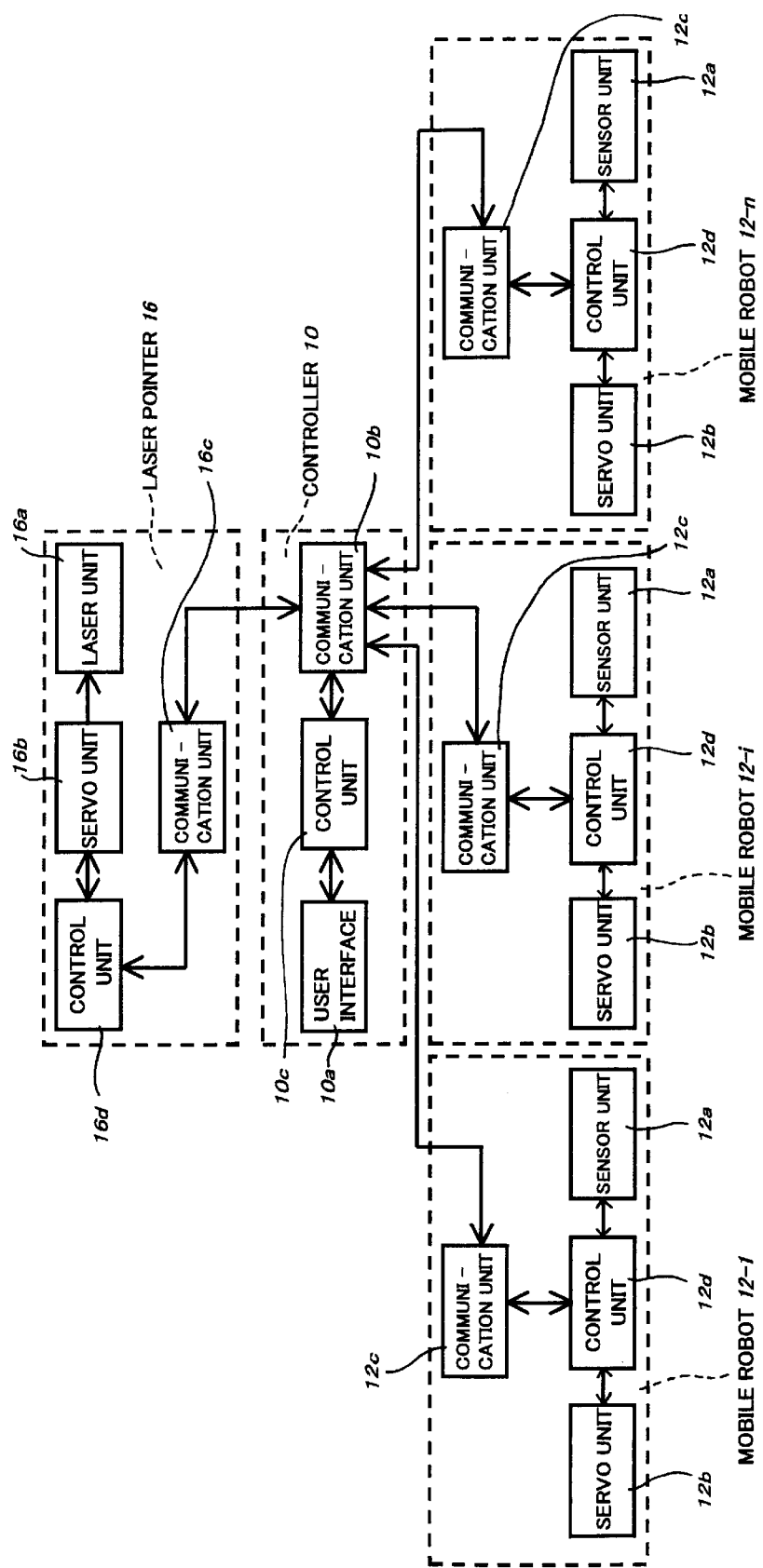
FIG. 3 is a further detailed block diagram of the block diagram shown in FIG. 2.

FIG. 3 is a further detailed block diagram of the block diagram shown in FIG. 2. In the following, a detailed constitution of the optical guidance system for mobile bodies will be described by referring to FIG. 3.

First, the laser pointer 16 comprises a laser unit 16a, a servo unit 16b, a communication unit 16c, and a control unit 16d wherein operations of the servo unit 16b and the communication unit 16c are controlled by the control unit 16d.

In these circumstances, the laser unit 16a emits light beam of a predetermined color onto a desired region in the floor surface 14 to produce light beacons having the predetermined color onto the desired region in the floor surface 14. The light beacons thus produced indicate target positions in the case where the mobile robots 12-1, . . . , 12-i, . . . , and 12-n transfer on the floor surface 14.

Furthermore, operations of the servo unit 16b are controlled by the control unit 16d to control operations for lighting up/lighting out of the laser unit 16a. Hence, it results in control for starting/stopping projection of a laser beam onto the floor surface 14 as well as to direct an optical axis of the laser beam projected from the laser unit 16a on a desired position of coordinates in the floor surface 14.

More specifically, the servo unit 16b serves to transfer the laser unit 16a in such that a laser beam output from the laser unit 16a reaches a desired position of coordinates on a desired surface in an environment.

The servo unit 16b as described above may be constituted in the form of, for example, a robot manipulator; and a color CCD camera may be mounted on the robot manipulator in such that an orientation of optical axis of a laser beam output from the laser unit 16a is controlled on the basis of visual data obtained from the color CCD camera.

Moreover, operations of the communication unit 16c are controlled by the control unit 16d to communicate with a communication unit 10c of the controller 10.

The control unit 16d is composed of a microcomputer that processes to output a control command for controlling the above-described servo unit 16b and the communication unit 16c, and further processes to transform coordinates between the floor surface 14 and the servo unit 16b.

Therefore, according to the above-described laser pointer 16, a beam of the laser beam projected from the laser unit 16a can be allowed to direct on a predetermined position of the floor surface 14 on which are to be produced light beacons as target positions in the case where the mobile robots 12-1, . . . , 12-i, . . . , and 12-n transfer.

More specifically, the laser pointer 16 indicates target positions on the floor surface 14 in an environment in the case when mobile robots 12-1, . . . , 12-i, . . . , and 12-n transfer. In the environment, target positions are computed by the controller 10 in accordance with a requirement for transfer of the mobile robots 12-1, . . . , 12-i, . . . , and 12-n, and the resulting target positions are transmitted to the control unit 16d of the laser pointer 16.

Namely, beams of the laser beams output from the laser pointer 16 are directed to predetermined positions on the floor surface 14; and positions of numerical coordinates on which the beams of the laser beams are to be projected are transmitted from the controller 10 to the control unit 16d and obtained as target positions in the case where the mobile robots 12-1, . . . , 12-i, . . . , and 12-n transfer.

The control unit 16d of the laser pointer 16 implements coordinate transformation, and at the same time, it outputs a control command for reorienting an optical axis of the light beam to direct the same on desired coordinates in the floor surface 14.

When a corresponding control command is received by the control unit 16d of the laser pointer 16 from the controller 10, the control unit 16d controls driving in the laser unit 16a to either start or stop projection of laser beam.

Then, the mobile robots 12-1, . . . , 12-i, . . . , and 12-n will be described. Each of these mobile robots 12-1, . . . , 12-i, . . . , and 12-n performs tasks for transfer in an environment, which is composed of a sensor unit 12a, a servo unit 12b, a communication unit 12c, and a control unit 12d wherein operations of the sensor unit 12a, the servo unit 12b, and the communication unit 12c are controlled by the control unit 12d.

The sensor unit 12a detects light beacons having specified features, for example color produced on the floor surface 14, and it may be composed of, for example, a color CCD or PSD camera or the like. Such a sensor unit 12a measures a relative distance between each frame of the mobile robots 12-1, . . . , 12-i, . . . , and 12-n and each target in an environment to compute a relative coordinate of specified colored light dots on the floor surface 14, and at the same time, supplies visual data for estimating coordinates of the mobile robots 12-1, . . . , 12-i, . . . , and 12-n relating to a common, coordinate system.

The control unit 12d is composed of a microcomputer and implements such processing that relative coordinates of positions where light dots being objects to be detected by a sensor unit 12a reside are specified on the basis of results detected by a sensor unit 12a.

More specifically, the control unit 12d processes data (visual data in the case where the sensor unit 12a is a color CCD or PSD camera) collected by the sensor unit 12a, and specifies relative coordinates of positions where predetermined colored light dots reside. Furthermore, the control unit 12d produces a control command for tracking target positions by computation of position, orientation, and speed required for transfer of the mobile robots 12-1, . . . , 12-i, . . . , and 12-n.

On one hand, such a servo unit 12b executes a control command produced by the control unit 12d wherein the mobile robots 12-1, . . . , 12-i, . . . , and 12-n on each of which has been mounted a servo unit 12b are allowed to transfer in response to relative coordinates specified by the control unit 12d.

Moreover, such a communication unit 12c communicates with a communication unit 10c of the controller 10 in respect of the relative coordinates and the like specified by a control unit 12d.

Data obtained from the sensor units 12a and the servo units 12b is supplied to a control units 12d producing a control command for the servo units 12b.

Besides, a control unit 12d can communicate with the control unit 10c of the controller 10 through the communication unit 12c as well as with a control unit 12d contained in the other mobile robot, for example by means of wireless ethernet.

In the following, the controller 10 will be described. The controller 10 is composed of a user interface 10a, a communication unit 10b, and a control unit 10c wherein operations of the user interface 10a and the communication unit 10b are controlled by the control unit 10c.

The user interface 10a is used for inputting properties of the mobile robots 12-1, . . . , 12-i, . . . , and 12-n as well as conditions of an environment, in which the mobile robots 12-1, . . . , 12-i, . . . , and 12-n transfer, by a user (human being) with respect to the control unit 10c.

The control unit 10c is composed of a microcomputer, and transmits target positions in the case where the mobile robots 12-1, . . . , 12-*i*, . . . , and 12-*n* transfer with respect to a communication unit 16*c* of a laser pointer 16 through a communication unit 10*b*.

Furthermore, the control unit 10*c* communicates with communication units 12*c* of the mobile robots 12-1, . . . , 12-*i*, . . . , and 12-*n* through the communication unit 10*b*, and when a report of ready for start is received from the mobile robot.; 12-1, . . . , 12-*i*, . . . , and 12-*n*, the control unit 10*c* accepts new target positions, acquires succeeded or unsucceeded results for specifying target positions, and receives a report for accession of the mobile robots 12-1, . . . , 12-*i*, . . . , and 12-*n* to target positions.

Namely, the controller 10 controls to supervise: operations of the mobile robots 12-1, . . . , 12-*i*, . . . , and 12-*n* in an environment represented by an environmental model, and to adjust the same therefor. Moreover, the controller 10 computes target positions as to the mobile robots 12-1, . . . , 12-*i*, . . . , and 12-*n*, and communicates with the control units 12*d* of the mobile robots 12-1, . . . , 12-*i*, . . . , and 12-*n*.

More specifically, the controller 10 performs a task planning and allocation of transfer of the mobile robots 12-1, . . . , 12-*i*, . . . , and 12-*n* in accordance with a requirement for transfer of the mobile robots 12-1, . . . , 12-*i*, . . . , and 12-*n*. This is realized for incorporating an instruction for transfer of target positions to which are directed by the mobile robots 12-1, . . . , 12-*i*, . . . , and 12-*n* into a schedule by means of such operations that the controller 10 communicates with the control units 12*d* of the mobile robots 12-1, . . . , 12-*i*, . . . , and 12-*n* as well as the control unit 16*d* of the laser pointer 16 to transmit a request for detecting and specifying target positions as to the mobile robots 12-1, . . . , 12-*i*, . . . , and 12-*n*, whereby the newest positions of the mobile robots 12-1, . . . , 12-*i*, . . . , and 12-*n* in an environmental model are updated.

Namely, the mobile robots 12-1, . . . , 12-*i*, . . . , and 12-*n* function to transfer or to check objects in environments such as assembly stations. Such mobile robots 12-1, . . . , 12-*i*, . . . , and 12-*n* are made to be movable autonomously with respect to specified target positions, respectively.

A sensor unit 12*a* of the mobile robots 12-1, . . . , 12-*i*, . . . , and 12-*n* functions to supervise a local environment, to detect predetermined color of light in the floor surface 14, and to specify the positions thereof.

The sensor unit 12*a* is composed of an optical sensor (there are, for example, a color CCD or PSD camera, infrared sensors and the like as the optical sensor), which is the one for collecting visual data with respect to local environments.

Data collected by the sensor unit 12*a* is processed in a control unit 12*d* to detect predetermined light dots in the floor surface 14, whereby relative coordinates between the light dots and a mobile body in question are specified.

A sensor unit 12*a* contains also encoders or the other sensors for calculating odometry data of each of the mobile robots 12-1, . . . , 12-*i*, . . . , and 12-*n* in order to obtain position and orientation of the mobile robots, for example in a common coordinate system.

A servo unit 12*b* contains a wheel servo systems, which execute a control command output from a control unit 12*d*.

The servo unit 12*b* operates to achieve a position, an orientation, and a speed appointed by the control command.

A control unit 12*d* processes data obtained from a sensor unit 12*a* and a servo unit 12*b*, outputs a control command; and the control command thus output is executed by the servo unit 12*b* as described above.

A control unit 12*d* is arranged in such that it is possible to communicate with the controller 10 by means of a client/server communicating system and wireless ethernet or an infra-red communication system, and further, it is also possible to communicate with any control unit of mobile robots other than that contained in a mobile robot itself.

In the above constitution, an outline of processing according to the above-described optical guidance system for mobile bodies will be described. This optical guidance system for mobile bodies utilizes a wireless communication as a manner for communication between a communication unit of the controller 10 and the control units 12*c* of the mobile robots 12-1, . . . , 12-*i*, . . . , and 12-*n*, or the communication unit 16*c* of the laser pointer 16 in addition to utilization of a client/server system.

More specifically, in the optical guidance system for mobile bodies, a laser beam having a predetermined color is projected on the floor surface 14 by means of the laser unit 16*a* of the laser pointer 16 to produce light dots on the floor surface 14, whereby positions represented by the light dots are to be target positions towards which the mobile robots 12-1, . . . , 12-*i*, . . . , and 12-*n* are to be transferred.

In this case, positions of the light dots produced on the floor surface 14 correspond to numerical coordinates of target positions computed by the control unit 10*c* of the controller 10 in accordance with required tasks and setting in accordance with such a manner of operations that a user (human being) points out by means of a hand-held laser pointer 16 or clicks with a mouse desired positions on a screen of a display on which a map representing an environment displays wherein the mobile robots 12-1, . . . , 12-*i*, . . . , and 12-*n* transfer.

In the optical guidance system for mobile bodies, it is possible to appoint successively target positions concerning a number of mobile robots 12-1 . . . , 12-*i*, . . . , and 12-*n* existing in an environment by means of a single laser pointer 16.

The mobile robots 12-1, . . . , 12-*i*, . . . , and 12-*n* detect light dots produced on the floor surface 14 by means of sensor units 12*a*, and further determine relative coordinates of the light dots with respect to the mobile robots 12-1, . . . , 12-*i*, . . . , and 12-*n* by means of the control units 12*d*.

Such visual feedback using the sensor units 12*a* and the control units 12*d* assure that the mobile robots 12-1, . . . , 12-*i*, . . . , and 12-*n* track correctly target positions.

Namely, since a closed loop control based on visual feedback is used in place of an open loop control in the optical guidance system for mobile bodies, positioning and tracking accuracy in the mobile robots 12-1, . . . , 12-*i*, . . . , and 12-*n* can be elevated.

According to the optical guidance system for mobile bodies, a desirable path to be tracked by the mobile robots 12-1, . . . , 12-*i*, . . . , and 12-*n* can be indicated by the laser pointer 16 as sequential target positions.

In the optical guidance system for mobile bodies, positions based on incorrect dead-reckoning data are not specified. However, when the mobile robots 12-1 . . . , 12-*i*, and 12-*n* reach the respective target positions by means of the servo units 12*b*, positions of the mobile robots 12-1, . . . , 12-*i*, . . . , and 12-*n* in an environment are specified, whereby positional information of the mobile robots 12-1, . . . , 12-*i*, . . . , and 12-*n* in an environmental model are updated to the newest information based on the thus specified positions.

In the following, processing implemented in accordance with the optical guidance system for mobile bodies will be described by referring to FIG. 1 wherein $(X_w, Y_w)$ represent a common coordinate system.

In this case, coordinates $(x_t, y_t)$ are that of a target position towards which a mobile robot 12-$i$ is to be transferred, while coordinates $(x_o, y_o)$ are that of a laser pointer 16.

Furthermore, the laser pointer 16 is situated at a height $h_o$ from the floor surface, and has at least two degrees-of-freedom $(\grave{e}_1, \grave{e}_2)$.

A light beam from the laser pointer 16 will indicate the coordinates $(x_t, y_t)$ on the floor surface 14, if an orientation $\grave{e}(\grave{e}=(\grave{e}_1, \grave{e}_2)^T)$ of the laser pointer 16 is obtained from the following expressions (1) and (2):

$$\tan \grave{e}_1 = (y_o - y_t)/(x_o - x_t) \quad \text{Expression (1)}$$

$$\tan \grave{e}_2 = \{(x_o - x_t)^2 + (Y_o - y_t)^2/h_o\}^{1/2} \quad \text{Expression (2)}$$

The optical guidance system for mobile bodies operates in accordance with a basic algorithm described in the following steps 1 to 6 in order to indicate target positions for the mobile robots 12-1, ..., 12-$i$, ..., and 12-$n$:

Step 1: Establish a communication between the control unit 10$c$ and the control units 12$d$ of the mobile robots 12-1, ..., 12-$i$, ..., and 12-$n$.

Step 2: Transmit a request from the control unit 10$c$ of the controller 10 to confirm whether or not the control units 12$d$ of the mobile robots 12-1, ..., 12-$i$, ..., and 12-$n$ are ready to process new target positions.

Step 3: If the control units 12$d$ of the mobile robots 12-1, ..., 12-$i$, ..., and 12-$n$ are ready to process new target positions, then set the laser pointer 16 in an appropriate orientation $\grave{e}$, otherwise return to the step 2.

Step 4: In order to indicate the target positions on the floor surface 14, drive the laser unit 16$a$ of the laser pointer 16 to project a laser beam on the floor surface 14.

Step 5: If the control units 12$d$ of the mobile robots 12-1, ..., 12-$i$, ..., and 12-$n$ confirm detection of target positions indicated on the floor surface 14, then stop driving of the laser unit 16$a$ of the laser pointer 16 to cease projection of the laser beam, otherwise wait until the confirmation for detection of the target positions indicated on the floor surface 14 by the control units 12$d$ of the mobile robots 12-1, ..., 12-$i$, ..., and 12-$n$ or a failure response of the confirmation is received.

Step 6: In the case when target positions indicated could not be detected (the above-described failure response), then proceed to a failure analysis the reason why the detection could not be made and its compensation, for example, by means of setting target positions closer to the mobile robots 12-1, ..., 12-$i$, ..., and 12-$n$.

Step 7: If other target positions must be set, then return to the step 2 to repeat the processing, otherwise stop.

According to the above-described optical guidance system for mobile bodies, precision and reliability in case of setting target positions can be elevated.

Moreover, the above-described optical guidance system for mobile bodies can be realized inexpensively and technically.

In the above-described preferred embodiment, although a detailed description has been omitted, TCP/IP and wireless ethernet may be used as a client/server system for communication between the control unit 10$c$ of the controller 10 and the control units 12$d$ of the mobile robots 12-1, ..., 12-$i$, ..., and 12-$n$.

In the above-described preferred embodiment, it may be arranged in such that either a variety of information is transmitted to the controller 10 through a network or a variety of information is received from the controller 10 through a network. More specifically, it may be arranged in such that information for controlling the laser pointer 16 is delivered to the controller 10 through a network, and the laser pointer 16 is controlled on the basis of the information thus delivered.

Although the laser pointer 16 has been employed as a light beam-projecting device in the above-described embodiment, the invention is not limited thereto as a matter of course, LED, mercury lamp, or fluorescent lamp may be employed as light beam projecting device.

Moreover, while the laser pointer 16, which produces light dots to instruct target positions with respect to mobile robots, is disposed on a ceiling, the invention is not limited thereto as a matter of course. In this respect, a compact laser pointer, which can be held by a user (human being); and positions for projection of which can be freely changed may be employed and arranged in such that the user instructs at hand target positions with respect to mobile robots, or that each mobile robot itself contains such a laser pointer to instruct target positions with respect to the other mobile robots. Besides, a laser pointer may be mounted on a robot manipulator; and operations of the robot manipulator are controlled thereby to change an optical axis of a light beam of the laser pointer.

Although the light beacons are predetermined light dots in the above described embodiment, the invention is not limited thereto as a matter of course. The light beacons may be obtained by lighting on or lighting off only or may be obtained by lighting a light beam having predetermined features (i.e. colors of lights, shapes of areas lighting on, brightness of areas lighting on, manners of lighting on such as methods of blinking light beams, patterns of blinking light beams and so on). When the light beacons are obtained by lighting a light beam having predetermined features, each mobile body becomes to be able to move the target position by recognizing respective light beacon, respectively.

Since the present invention has been constituted as described above, there are excellent advantages to provide a method for instructing target positions for mobile bodies in the case where the mobile bodies such as mobile robots transfer in accordance with a different manner as that of the prior art, a method for controlling transfer thereof, and a method as well as a system of optical guidance therefor.

Furthermore, since the present invention has been constituted as described above, there are excellent advantages to provide a method for instructing target positions for mobile bodies used suitably in the case where the mobile bodies such as mobile robots set target positions towards which the mobile bodies are to be transferred, respectively, in an environment wherein a number of the mobile bodies such as mobile robots exist, a method for controlling transfer thereof, and a method as well as a system of optical guidance therefor.

It will be appreciated by those of ordinary skill in the art that the present invention can be embodied in other specific forms without departing from the spirit or essential characteristics thereof.

The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. An optical guidance method of one or more mobile bodies contained movably in a predetermined environment, comprising projecting a light beam by a light projection device to produce a light beacon on a surface on which the mobile bodies move, said light beacon is moved to an arbitrary position by moving a direction of said light beam by said light projection device whereby the light beacon indicates an arbitrary target position toward which a mobile body is to move, wherein the light beacons produced on said surface on which the mobile bodies are to move are detected by the use of a visual device of a mobile body mounted thereon, and a relative positional relationship between the target positions represented by the light beacons and a present position of the mobile body in question is obtained by means of image data processing or signal processing, whereby the mobile body in question is controlled so as to move towards the light beacons produced on said surface on which the mobile bodies are to move.

2. The optical guidance method as claimed in claim 1 wherein target positions are indicated with respect to a specified mobile body while using said light beam projecting device, whereby the mobile body is guided to the target positions.

3. An optical guidance system for at least one or more of mobile bodies contained movably in a predetermined environment comprising:

a target position optically instructing means composed of;
   a light beam projecting means for projecting a light beam having a predetermined color or other features in a desired region on a predetermined surface on which the mobile bodies are to be transferred to produce the predetermined light beacons in the desired region on said predetermined surface, whereby the target positions towards which the mobile bodies are to be transferred are indicated, and
   a light beam projection control means for controlling operations of lighting up/lighting out in said light beam projecting means, whereby starting/stopping projection of light beam on said predetermined surface is controlled, besides an optical axis of the light beam projected from said light beam projecting means is directed to a desired position on said predetermined surface;
a detection specifying means composed of;
   a detection means for detecting the predetermined colored light beacons produced on said predetermined surface by means of a visual device, and
   a relative position specifying means for producing relative positional information, which indicates a relative position by specifying the relative position in question defined between the predetermined light beacons that is an object to be detected by said detection means and each of the mobile bodies in accordance with the results detected by said detection means, and
   transfer control means for controlling the mobile body, target positions of which have been indicated by means of the light beacons derived from said target position instructing means, so as to transfer towards the target positions on the basis of the relative positional information produced by said relative position specifying means.

4. The optical guidance system for at least one or more of mobile bodies as claimed in claim 3, further comprising communication means for communicating with a mobile body which is to be instructed the target positions towards which the mobile body is to be transferred on a predetermined surface.

5. The optical guidance system for at least one or more of mobile bodies as claimed in claim 3, wherein said detection specifying means are mounted on the at least one or more of mobile bodies contained movably in a predetermined environment, respectively.

6. The optical guidance system for at least one or more of mobile bodies as claimed in claim 3, wherein said light beam projecting means is fixed at a predetermined position.

7. The optical guidance system for at least one or more of mobile bodies as claimed in claim 4, wherein said light beam projecting means is fixed at a predetermined position.

8. The optical guidance system for at least one or more of mobile bodies as claimed in claim 5, wherein said light beam projecting means is fixed at a predetermined position.

9. The optical guidance system for at least one or more of mobile bodies as claimed in claim 3, wherein said light beam projecting means is mounted on a mobile body.

10. The optical guidance system for at least one or more of mobile bodies as claimed in claim 4, wherein said light beam projecting means is mounted on a mobile body.

11. The optical guidance system for at least one or more of mobile bodies as claimed in claim 5, wherein said light beam projecting means is mounted on a mobile body.

12. The optical guidance system for at least one or more of mobile bodies as claimed in claim 3, wherein:
   said light beam projecting means is equipped with a robot manipulator; and
   said light beam projection control means controls said robot manipulator thereby directing an optical axis of the light beam projected from said light beam projecting means to a desired position in said predetermined surface on which the mobile bodies are to be transferred.

13. The optical guidance system for at least one or more of mobile bodies as claimed in claim 4, wherein said light beam projection control means controls said robot manipulator thereby directing an optical axis of the light beam projected from said light beam projecting means to a desired position in said predetermined surface on which the mobile bodies are to be transferred.

14. The optical guidance system for at least one or more of mobile bodies as claimed in claim 5, wherein:
   said light beam projecting means is equipped with a robot manipulator; and
   said light beam projection control means controls said robot manipulator thereby directing an optical axis of the light beam projected from said light beam projecting means to a desired position in said predetermined surface on which the mobile bodies are to be transferred.

15. The optical guidance system for at least one or more of a mobile bodies as claimed in claim 3, wherein said light beam projecting means is hand-held by a human operator.

16. The optical guidance system for at least one or more of mobile bodies as claimed in claim 4, wherein said light beam projecting means is hand-held by a human operator.

17. The optical guidance system for at least one or more of a mobile bodies as claimed in claim 5, wherein said light beam projecting means is hand-held by a human operator.

18. The optical guidance system for at least one or more of mobile bodies as claimed in claim 3, wherein said light beam projection control means controls said light beam projecting means on the basis of information obtained through a network.

19. The optical guidance system for at least one or more of mobile bodies as claimed in claim 4, wherein said light beam projection control means controls said light beam projecting means on the basis of information obtained through a network.

20. The optical guidance system for at least one or more of mobile bodies as claimed in claim 5, wherein said light beam projection control means controls said light beam projecting means on the basis of information obtained through a network.

21. The optical guidance system for at least one or more of mobile bodies as claimed in claim 6, wherein said light beam projection control means controls said light beam projecting means on the basis of information obtained through a network.

22. The optical guidance system for at least one or more of mobile bodies as claimed in claim 7, wherein said light beam projection control means controls said light beam projecting means on the basis of information obtained through a network.

23. The optical guidance system for at least one or more of mobile bodies as claimed in claim 8, wherein said light beam projection control means controls said light beam projecting means on the basis of information obtained through a network.

24. The optical guidance system for at least one or more of mobile bodies as claimed in claim 9, wherein said light beam projection control means controls said light beam projecting means on the basis of information obtained through a network.

25. The optical guidance system for at least one or more of mobile bodies as claimed in claim 10, wherein said light beam projection control means controls said light beam projecting means on the basis of information obtained through a network.

26. The optical guidance system for at least one or more of mobile bodies as claimed in claim 11, wherein said light beam projection control means controls said light beam projecting means on the basis of information obtained through a network.

27. The optical guidance system for at least one or more of mobile bodies as claimed in claim 12, wherein said light beam projection control means controls said light beam projecting means on the basis of information obtained through a network.

28. The optical guidance system for at least one or more of mobile bodies as claimed in claim 13, wherein said light beam projection control means controls saud light beam projecting means on the basis of information obtained through a network.

29. The optical guidance system for at least one or more of mobile bodies as claimed in claim 14, wherein said light beam projection control means controls said light beam projecting means on the basis of information obtained through a network.

30. The optical guidance system for at least one or more of mobile bodies as claimed in claim 15, wherein said light beam projection control means controls said light beam projecting means on the basis of information obtained through a network.

31. The optical guidance system for at least one or more of mobile bodies as claimed in claim 16, wherein said light beam projection control means controls said light beam projecting means on the basis of information obtained through a network.

32. The optical guidance system for at least one or more of mobile bodies as claimed in claim 17, wherein said light beam projection control means controls said light beam projecting means on the basis of information obtained through a network.

33. An optical guidance system for at least one or more of mobile bodies contained movably in a predetermined environment comprising:
    light beam projecting means for projecting a light beam having a predetermined color or other features in a desired region on a predetermined surface on which the mobile bodies are to be transferred to produce the predetermined light beacons in the desired region on said predetermined surface, whereby the target positions towards which the mobile bodies are to be transferred are indicated, said light beam projecting means being held by a human being and an optical axis of the light beam being directed to a desired position in said predetermined surface by means of operations of the human being;
    communication means for communicating with a mobile body which is to be instructed the target positions towards which the mobile body is to be transferred on a predetermined surface;
    detection specifying means composed of;
        detection means for detecting the predetermined light beacons produced on said predetermined surface by means of a visual device, and
        relative position specifying means for producing relative positional information, which indicates a relative position by specifying the relative position in question defined between the predetermined light beacons that is an object to be detected by said detection means and each of the mobile bodies in accordance with the results detected by said detection means, and
    transfer control means for controlling the mobile body, target positions of which have been indicated by means of the light beacons derived from a target position instructing means, so as to transfer towards the target positions on the basis of the relative positional information produced by said relative position specifying means.

34. A method for indicating target positions for one or more mobile bodies contained movably in a predetermined environment, comprising:
    projecting a light beam to produce a light beacon on a surface on which the mobile bodies move, said light beacon is moved to an arbitrary position by moving a direction of said light beam whereby the light beacon indicates an arbitrary target position towards which a mobile body is to move.

* * * * *